(12) United States Patent
Hu et al.

(10) Patent No.: US 7,622,423 B1
(45) Date of Patent: Nov. 24, 2009

(54) SYNTHESIS OF MODIFIED MAGHEMITE AND JACOBSITE NANOPARTICLES

(75) Inventors: Jing Hu, Kowloon (HK); Man Chi Lo, Mid-Levels East (HK); Guohua Chen, Kowloon (HK)

(73) Assignee: The Hong Kong University of Science & Technology, Hong Kong (CN)

( * ) Notice: Subject to any disclaimer, the term of this patent is extended or adjusted under 35 U.S.C. 154(b) by 442 days.

(21) Appl. No.: 11/520,149

(22) Filed: Sep. 12, 2006

(51) Int. Cl.
*B01J 20/02* (2006.01)
(52) U.S. Cl. .................................. 502/406; 423/493
(58) Field of Classification Search .............. 502/406; 423/493
See application file for complete search history.

(56) References Cited

OTHER PUBLICATIONS

Elliott, Daniel W, et al.; *Field Assessment of Nanoscale Bimetallic Particles for Groundwater Treatment;* Environ. Sci. Technol. (2001), 35, 4922-4926.
Jean, Jau-Ho, et al.; *Adsorption of Poly(Vinyl Butyral) in Nonaqueous Ferrite Suspensions*; J. Mater. Res., (1997), vol. 12, No. 4, 1062-1068.
Mak, Sou-Yee et al.; *Fast Adsorption of Methylene Blue on Polyacrylic Acid-Bound Iron Oxide Magnetic Nanoparticles*; Dyes and Pigments (2004), 61, 93-98.
Melitas, Nikos et al.; *Kinetics of Soluble Chromium Removal from Contaminated Water by Zerovalent Iron Media: Corrosion Inhibition and Passive Oxide Effects*; Environ. Sci. Technol. (2001), 35, 3948-3953.
Navratil, J.D. et al.; *Magnetic Separation of Iron and Heavy Metals from Water*; Water Science and Technology (2002), vol. 47, No. 1, 29-32.
Oliveira, Luiz C.A. et al.; *Magnetic Particle Technology*; Journal of Chemical Education, (2004), vol. 81, No. 2, 248-250.
Oliveira, Luiz C.A et al.; *Clay-Iron Oxide Magnetic Composites for the Adsorption of Contaminants in Water*; Applied Clay Science (2003), 22, 169-177.
Pan, Gang et al.; *EXAFS Studies on Absorption-Desorption Reversibility at Manganese Oxides-Water Interfaces I. Irreversible Absorption of Zinc onto Manganite ($\gamma$-MnOOH)*; Journal of Colloid and Interface Science (2004) 271, 28-34.
Peng, Z.G. et al.; *Adsorption of Bovine Serum Albumin on Nanosized Magnetic Particles*; Journal of Colloid and Interface Science (2004) 271, 277-283.
Ponder, Sherman M. et al.; *Remediation of Cr(Vi) and Pb(II) Aqueous Solutions Using Supported, Nanoscale Zero-Valent Iron*; Environ. Sci. Technol. (2000), 34, 2564-2569.
Qiu, S.R. et al.; *Removal of Contaminants from Aqueous Solution by Reaction with Iron Surfaces*; Langmuir (2000), 16, 2230-2236.
Unnithan, Maya R. et al.; *The Kinetics and Thermodynamics of Sorption of Chromium(VI) on to the Iron (III) Complex of a Carboxylated Polyacrylamide-Grafted Sawdust*; Ind. Eng. Chem. Res. (2001), 40, 2693-2701.

*Primary Examiner*—Edward M Johnson
(74) *Attorney, Agent, or Firm*—Robert D. Katz, Esq.; Cooper & Dunham LLP (57) ABSTRACT

The present invention provides a method for making modified jacobsite, Al-doped maghemite or modified maghemite nanoparticles that can be used to adsorb heavy metals, such as Cr(VI), found in wastewater. The magnetic nanoparticles can be separated using a magnetic field after adsorbing heavy metals from wastewater, and processed for reused.

11 Claims, 8 Drawing Sheets

SYNTHESIS OF MODIFIED MAGHEMITE AND JACOBSITE NANOPARTICLES

FIELD OF THE INVENTION

The present invention relates the use of nanoparticle adsorption combining with magnetic separation to remove and recover heavy metals from industrial wastewater. More specifically, the present invention relates to the methods of producing three types of magnetic nanoparticles (maghemite, Al-doped maghemite and modified jacobsite) and adsorbing heavy metals with using these nanoparticles. After treatment, the metal-adsorbed nanoparticles are separated under an external magnetic field.

BACKGROUND OF THE INVENTION

The presence of heavy metals in wastewater and surface water is becoming a severe environmental and public health problem. The removal of heavy metals from both natural water supplies and industrial wastewater streams is becoming increasingly significant as awareness of the environmental impact of such pollutants is fully realized. In particular, copper, nickel and chromium found in wastewaters are designated as priority pollutants by the United States Environmental Protection Agency (EPA). Among them, hexavalent chromium is of special concern due to its high toxicity. The vast majority of toxic metals are waste products of industrial and metallurgical processes. The effluents from electroplating plants, metal finishing operations and extractive metallurgy processes contain especially high concentrations of dissolved metals. Metal ion containing waste solutions are commonly found at levels that exceed acceptable disposal limits. These pollutant concentrations must be reduced to meet the legislative standards, and recovered where feasible.

Various techniques are available for the removal of heavy metals from wastewater. Chemical precipitation is the most common method of metal removal for wastewater with high strength of heavy metal. The chemicals most frequently used for precipitation of metals are lime, caustic, and sodium carbonate. Although most heavy metals are precipitated readily by pH adjustment, hexavalent chromium is highly soluble and does not precipitate out of solution at any pH. Consequently, treatment for chromium usually consists of a two-stage process: first, the reduction of hexavalent chromium to the trivalent form; and, second, the precipitation of the trivalent chromium. Cr(VI)-bearing streams are segregated and treated separately; the reduced chromium-containing effluent can then be blended with other metal-contaminated streams for further treatment. An additional problem relating to handling the copious quantities of sludge produced is the disposal of sludge, which is again an economical and environmental issue. Therefore, recovery of the chromium present in industrial wastewater is necessary for economical and environmental reasons.

Attention has thus turned to non-consumptive methods which include ion exchange and adsorption process. The former process for selective removal and recovery of metals has been used for years. However, the high capital and operating costs make this process economically unfeasible, unless the treated effluent can be recycled and reused. Adsorption has emerged as a cost-effective technique for removing metals from wastewater, and has been widely studied during recent decades. In principle, adsorption not only can remove heavy metals but also can recover and recycle them back into the industrial process. The most commonly used adsorbent for heavy metal removal is activated carbon. But the potential problems are the high regeneration cost and the loss of adsorption capacity due to attrition during the regeneration process in which the used carbon needs to be regenerated at high temperature (near 1000° C.) commonly used by commercial regenerators. In addition, part of the carbon may be destroyed by chemical treatment. Taken together, regeneration of the solids is relatively uneconomical compared to disposal, and the resultant carbon wastes become a secondary pollution stream.

The application of magnetic particle technology to solve environmental problems is one of several new and innovative methods that have received considerable attention in recent years. Magnetic particles can be used to adsorb contaminants from aqueous effluents, and after the adsorption the adsorbent can be separated from the solution by a simple magnetic process. Furthermore, the adsorbed metals can be concentrated into a small volume by stripping the metals off the surface using an appropriate stripping agent for reuse, and permits recovery of the magnetic particles. However, most of these adsorbents have the disadvantages of small adsorption capacity or slow adsorption rate, due to small surface area or porous properties (respectively), which limits their use in wastewater treatment. In addition, recovery of these adsorbents for reuse is unsatisfactory.

Thus, it would be a significant advancement in the art to provide an improved method and superior material for treating industrial wastewater. It is an object of the invention to provide such a system that would be able to remove heavy metals without producing any sludge. It would be desirable to provide such method which can regenerate the adsorbent for reuse and also recover the valuable metals for industrial purpose. It is further object to provide method which is less costly and simpler to operate and less costly than conventional apparatus.

SUMMARY OF THE INVENTION

The disadvantages of prior systems and methods are overcome and the objects and advantages of the invention are achieved by providing a method for synthesizing undoped and metal-doped maghemite nanoparticles, comprising the steps of dissolving $FeCl_2.4H_2O$ and $FeCl_3.6H_2O$ salts in purified deoxygenated water to obtain a solution; adding base to the solution to precipitate the maghemite nanoparticles; isolating the maghemite nanoparticles by a physical separation technique; and removing impurities from the maghemite nanoparticles.

The invention further provides a method for synthesizing surface-modified jacobsite nanoparticles comprising the steps of dissolving $Mn(NO_3)_2.4H_2O$ and $Fe(NO_3)_3.6H_2O$ salts in dehydrogenated, purified water adding base to the solution until the pH reaches about 11; heating the mixture solution to a temperature of about 80° C. to 100° C., and maintaining the solution at this temperature for about two hours; collecting the precipitate, removing impurities, and then freeze-drying the precipitate to obtain freeze dried jacobsite particles. The jacobsite nanoparticles are added to a basic solution with bubbling condensed air under vigorous mechanical agitation while heating the above solution to about 100° C. for about 2 hours. Following that, the surface modified jacobsite nanoparticles are separated and freeze-dried.

The invention also provides a method for selectively removing heavy metals from wastewater comprising the steps of adding maghemite nanoparticles to a volume of wastewater; adjusting the pH of the wastewater containing particles to about 2.5, 6.5, or 8.5 for the maximum adsorption of Cr(VI), Cu(II), or Ni(II), respectively. The mixture of particles and wastewater solution to permit adsorption of metal ions on the nanoparticles. The nanoparticles with metal ions absorbed thereon are separated from solution with a magnetic field.

BRIEF DESCRIPTION OF THE DRAWINGS

Further features, details, and advantages of the invention will become apparent upon review of the following detailed description of the preferred embodiments taken in conjunction with the following drawings in which.

DETAILED DESCRIPTION OF THE PREFERRED EMBODIMENTS

Targeting at circumventing some limitations and disadvantages of the related technology, the present invention has been developed to treat an industrial wastewater containing heavy metals. In particular, in response to the problems and needs in the art that have not yet been fully solved by currently available water treatment techniques and materials, methods for synthesizing magnetic nanoparticles and treating heavy metals from metal contaminated wastewater using these nanoparticles are disclosed herein.

A magnetic nanoparticle adsorption system has been developed to remove and regenerate heavy metals from aqueous effluents. As mentioned before, most of the magnetic materials applied nowadays for wastewater treatment have the disadvantages of small adsorption capacity due to large size. Nanosized magnetic particles overcome this problem and can produce larger specific surface area, thereby resulting in high adsorption capacity for metal removal. High active sites of particles will easily bind ions in solution when mixed with dissolved metals. The binding between the heavy metals and the particle surface can be ion exchange, electrostatic attraction or surface complexation, depending on the solution pH, type of heavy metals or adsorbent.

The process of the present invention includes the synthesis of three kinds of magnetic nanoparticles and the characterization of the synthesized materials. Maghemite ($\gamma$-$Fe_2O_3$) nanoparticles are synthesized using a sol-gel method. The size of the maghemite particles is found to be about 10 nm using TEM. The identity and purity of the maghemite nanoparticles are verified by x-ray diffraction (XRD). The surface area was measured as 198 $m^2$/g. The Al-doped maghemite nanoparticles are also synthesized using sol-gel method. The needle-shaped and round particles are also present in an TEM image. Modified jacobsite ($MnFe_2O_4$) nanoparticles of about 15 nm are produced by chemical co-precipitation method with subsequent redox reaction. The XRD pattern verifies the presence of $\alpha$-$Fe_2O_3$, $\beta$-$MnO_2$, and $MnFe_2O_4$.

Batch adsorption experiments are carried out in laboratory. Since Cr(VI), Cu(II) and Ni(II) are most commonly existing metals in the effluents of plating factories, petroleum, electrolytic refining plants and acid mining industries, these three heavy metals are chosen for adsorption studies. Certain amount of maghemite nanoparticles are shaken with the ternary system for sufficient time. The selective removal of these three heavy metals is achieved by controlling solution pH. The Al-doped maghemite and surface-modified jacobsite nanoparticles are used for the enhanced treatment of the Cr(VI)-contaminated water. The adsorption of heavy metals reaches equilibrium very rapidly. The rapid adsorption is attributed to the external surface adsorption, which is definitely different from conventional microporous adsorption. Therefore, the equilibrium time for Cr(VI) adsorption by magnetic nanoparticles is much shorter than for other porous adsorbents, such as activated carbon. This result is encouraging, as equilibrium time is one of the important engineering parameters for an economical wastewater treatment system. Furthermore, this invention seems superior to chemical precipitation in its selectivity of treating heavy metals.

After adsorption/desorption process, a magnetic separation is used for the separation of nanoparticles from solution. The ferromagnetic properties of these nanoparticles render them very susceptible to magnetic fields, and therefore make separation of the solid and liquid phases relatively easy. In this case, magnetic separation successfully replaces conventional separation methods such as centrifugation, filtration or sedimentation, although such methods may of course be used. Compared to conventional separation, the advantages of magnetic separation are its speed, accuracy, and simplicity. Reversible adsorption process determines the possibility of recovering metal-adsorbed nanoparticles. Desorption experiments are conducted using the simple eluent 0.01 M NaOH. Heavy metal is released rapidly and completely from adsorbents into eluent. Recovered magnetic nanoparticles can be reused for the next cycle of adsorption process. No sludge is produced after a cycle of adsorption/desorption process.

The present invention demonstrates the several advantages of this system. It has been found that magnetic nanoparticles can be produced in large quantities using a simple sol-gel or co-precipitation method, indicative of the potential commercialization of such adsorbent; the adsorption capacity of magnetic nanoparticles is much higher due to the larger surface area (200-300 $m^2$/g) and highly active surface sites; the uptake process occurs via external adsorption, resulting in a very short adsorption time; the simple and rapid separation of metal-loaded magnetic nanoparticles from treated water is achieved via an external magnetic field; recovery of adsorbent and heavy metal are achieved simply with using some eluent; no secondary pollution such as sludge is produced, the handling and disposal costs of which are high.

To accomplish these objectives, the invention provides a method for synthesizing undoped and metal-doped maghemite nanoparticles, comprising the steps of dissolving $FeCl_2.4H_2O$ and $FeCl_3.6H_2O$ salts in purified deoxygenated water to obtain a solution; adding base to the solution to precipitate the maghemite nanoparticles; isolating the maghemite nanoparticles by a physical separation technique; and removing impurities from the maghemite nanoparticles. Preferably, the ratio of dissolved $FeCl_3.4H_2O$ to $FeCl_2, 6H_2O$ salts range between 1:1 and 1:3, and in the ratio of dissolved $FeCl_3.6H_2O$ is preferably about 1:2. Adding base involves adding 1.5M $NH_4OH$ solution in small amounts, and may be accomplished, for example, by adding aqueous ammonium hydroxide until the solution reaches or exceeds a pH of about 8. Preferably, the physical separation technique involves filtration or magnetic separation. The magnetic separation may involve using an externally applied magnetic field. In practicing the invention, the dissolving step additionally comprises adding an amount of $AlCl_3$ sufficient to dope the maghemite particles, while purifying involves heating the nanoparticles in the octyl ether or similar solvent.

The invention further provides a method for synthesizing surface-modified jacobsite nanoparticles comprising the steps of dissolving $Mn(NO_3)_2.4H_2O$ and $Fe(NO_3)_3.6H_2O$ salts in dehydrogenated, purified water; adding base to the solution until pH reaches about 11; heating the mixture solution to a temperature of about 80° C. to 100° C., and maintaining the solution at this temperature for about two hours, two hours is followed by collecting the precipitate, removing impurities, and then freeze-drying the precipitate to obtain freeze dried jacobsite particles. The jacobsite nanoparticles are added to a basic solution with bubbling condensed air under vigorous mechanical agitation; heated to about 100° C. for about two or more hours. The surface modified jacobsite nanoparticles are separated from solution and the freeze-dried.

The invention also provides a method for selectively removing heavy metals from wastewater comprising the steps of adding maghemite nanoparticles to a volume of wastewater; adjusting the pH of the wastewater containing particles to about 2.5, 6.5, or 8.5 for the maximum adsorption of Cr(VI), Cu(II), or Ni(II), respectively; stirring the mixture of particles and wastewater solution to permit adsorption of metal ions on the nanoparticles; and separating in a magnetic field the nanoparticles having metal ions adsorbed thereon from solution.

The invention additionally provides a method for removing and recovering Cr(VI) from wastewater comprising the steps of adding modified maghemite or jacobsite nanoparticles to a volume of wastewater adjusting the pH of the wastewater to about 2.5 to enhance adsorption of Cr(VI) stirring the mixture of nanoparticles and wastewater to induce adsorption of metal ions including Cr(VI) onto the nanoparticles; and applying a magnetic field to the nanoparticles to separate the nanoparticles from the wastewater. The invention may also include the step of adding Cr-adsorbed nanoparticles into a sodium hydroxide containing eluent to release Cr from the nanoparticles. The invention also provides maghemite or jacobsite nanoparticles made according to one of the foregoing methods.

Figure 1:
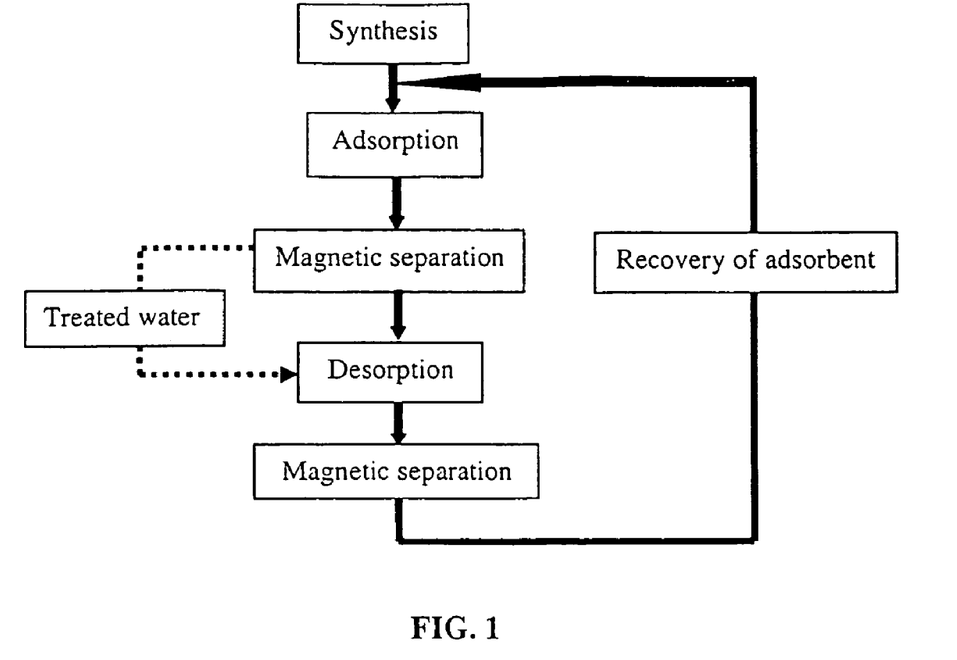
FIG. 1 is a flow diagram of a system for removal and recovery of heavy metals from wastewater in accordance with the present invention.

As discussed above, the present invention combines magnetic separation and nanoparticle adsorption. Such system appears to be highly efficient, cost-effective, environmentally sound and simple to use for the treatment of heavy metal from industrial wastewater. FIG. 1 is a flow diagram of a system for removal and recovery of heavy metals in accordance with the present invention. First, the magnetic nanoparticles were synthesized in the laboratory and purified using a magnet to remove some magnetic impurities. The dried magnetic nanoparticles were mixed with synthetic wastewater until reaching adsorption equilibrium. The treated water could be reused for preparing eluent if concentration of Cr(VI) in solution is decreased to nearly zero. The metal-adsorbed nanoparticles were collected using a magnet, and then added into 0.01 M NaOH eluent for desorption. After equilibrium, these recovered nanoparticles were again separated from solution with magnet; the Cr(VI) ions were released and highly concentrated in the eluent. Finally, recovered nanoparticles were recycled for reuse purpose.

Figure 2:
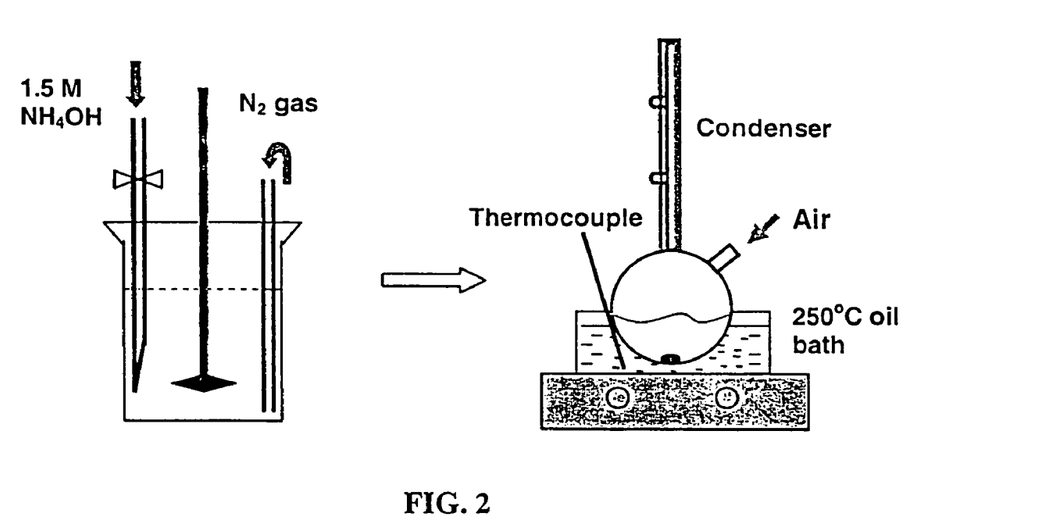
FIG. 2 is a schematic diagram of the reactors used to produce the maghemite or Al-doped maghemite nanoparticles of the present invention.

Maghemite nanoparticles were prepared using sol-gel method. FIG. 2 is a schematic diagram of the reactors used to synthesize the magnetic nanoparticles. First, 200 ml of highly purified, deoxygenated water (resistivity of 17.8 MO-cm) was bubbled by nitrogen gas for 30 minutes in the left reactor. Then $FeCl_2.4H_2O$ and $FeCl_3.6H_2O$ salts with a molar ratio of 1:2 were dissolved inside with mechanical stirring. Under the protection of nitrogen gas, 1.5 M $NH_4OH$ solution was added dropwise into the above solution under vigorous stirring. Other mild bases can be used, although $NH_4OH$ is preferred. After an initial brown precipitate, a black precipitate was formed. When the pH reached 8.0 (pH may range from about 8 to 9), the stirrer was turned off and magnetite settled gradually. The precipitate was isolated by an external magnetic field of 3000 G, and the supernatant decanted. To obtain pure and neutral products, synthesized materials were rinsed with ultrapure water three times. The magnetite nanoparticles suspended temporarily were retained by removing the quickly settling particles. Magnetite nanoparticles were collected after freeze-drying.

To isolate the maghemite nanoparticles, the above obtained powders were dispersed in 99% octyl ether and the mixture was heated with bubbling air gas in a 250° C. silica bath. Octyl ether maintains a high heating temperature due to its high boiling point (290° C.), and therefore is preferred, although other solvents having a boiling point in excess of 250° C. can be used. During the heating process, the black gel gradually transformed into brown. After heating for 2 hours, the nanogel was separated from the mixture using a magnet, and then washed with 99.9% ethanol for several times until all the octyl ether was removed. Finally, red-brown maghemite nanoparticles were produced after freeze-drying.

Al-doped maghemite nanoparticles were also prepared using the sol-gel method as shown in FIG. 2. Similarly, 200 ml of highly purified, deoxygenated water was prepared first. Then $AlCl_3$, $FeCl_2$ and $FeCl_3$ salts with a molar ratio of 0.28: 1:1.72 were added into the purified water. Under strong mechanical stirring, 2.0 M $NH_4OH$ solution was added dropwise (again other mild bases may be used). When the pH reached 8.0 (within the range of about 8 to 9), Al-doped magnetite settled gradually and was separated by an external magnetic field of 3000 G. After three times washing using ultrapure water and then freeze-drying, Al-doped magnetite nanoparticles were obtained and dispersed in 99% octyl ether (other solvents having a boiling point in excess of about 250° C. can be used. The mixture was heated with bubbling air in a 250° C. silica bath. After heating for 3 hours, the nanogel was separated from mixture using a magnet and then washed with 99.9% ethanol three times. Finally, dark-brown Al-doped maghemite nanoparticles were collected after freeze-drying.

Figure 3:
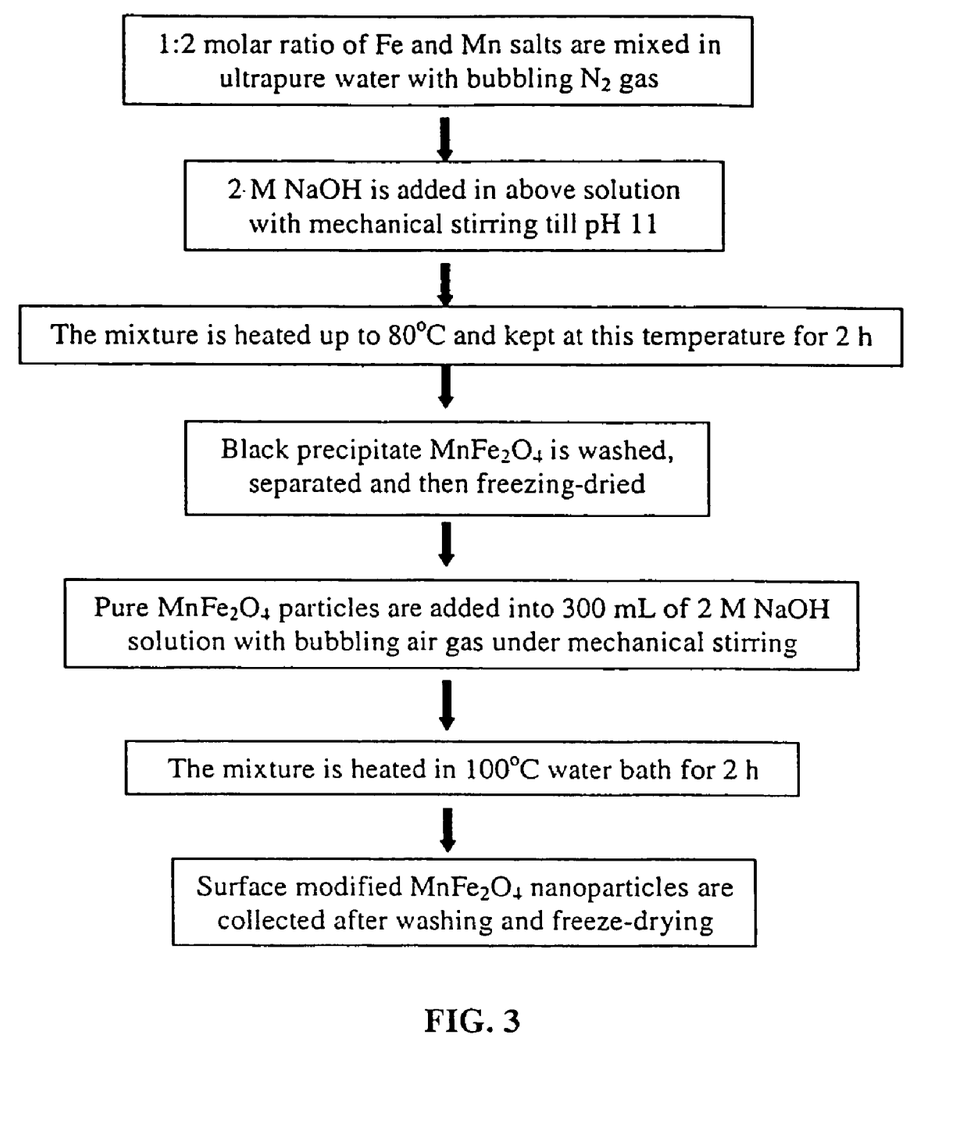
FIG. 3 is a flow chart of a method for producing surface modified jacobsite nanoparticles in accordance with the present invention.

Pure jacobsite nanoparticles were prepared using chemical co-precipitation and then modified using a redox reaction. FIG. 3 gives the flow chart for synthesizing surface-modified jacobsite nanoparticles. A 1:2 molar ratio of $Mn(NO_3)_2.4H_2O$ and $Fe(NO_3)_3.6H_2O$ salts were successively dissolved in deoxygenated highly purified or ultrapure water. Under mechanical stirring, 2.0 M NaOH solution was added dropwise into the above mixture until reaching pH 11 with bubbling nitrogen gas. The mixture was then heated to 80° C. and kept at this temperature for 2 hours. Black precipitate was collected using an external magnetic field, and washed with ultrapure water. This washing was repeated three times to remove the impurities (e.g., $OH^-$, $NO_3^-$, $Na^+$) associated with the procedure. Pure jacobsite nanoparticles were obtained after freeze-drying. Subsequently, the above obtained nanoparticles were added into 300 ml of 2 M NaOH solution with bubbling condensed air gas under vigorous mechanical stirring. The mixture was then heated in a 100° C. water bath for 2 hours. The modified particles were separated by magnetic field and then washed with ultrapure water. Finally, the surface-modified jacobsite nanoparticles were obtained after freeze-drying.

Figure 4:
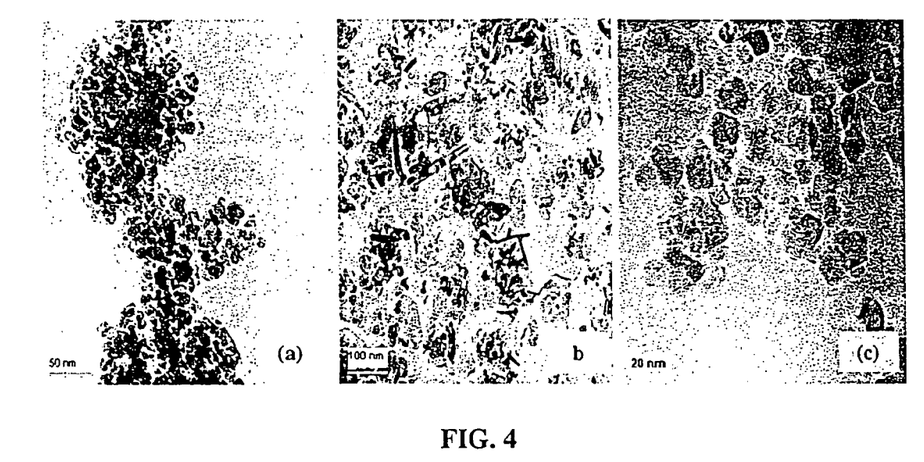
FIGS. 4a, 4b, and 4c are TEM photomicrographs of synthesized undoped maghemite, Al-doped maghemite, and modified jacobsite nanoparticles, respectively, made in accordance with the present invention.

The characterization of synthesized particles was carried out. FIGS. 4a, 4b and 4c show the TEM micrographs of the synthesized undoped maghemite, Al-doped maghemite and modified jacobsite nanoparticles, respectively. The TEM image from FIG. 4a reveals the aggregated crystalline maghemite nanoparticles with an average diameter of about 10 nm. The TEM image from FIG. 4b shows a small number of non-circular nanoparticles with lengths of 100 nm and widths of 10 nm, besides the circular ones, which is due to the Al doping. The TEM image from FIG. 4c presents the multidispersed jacobsite with a dimension of around 15 nm.

Figure 5:
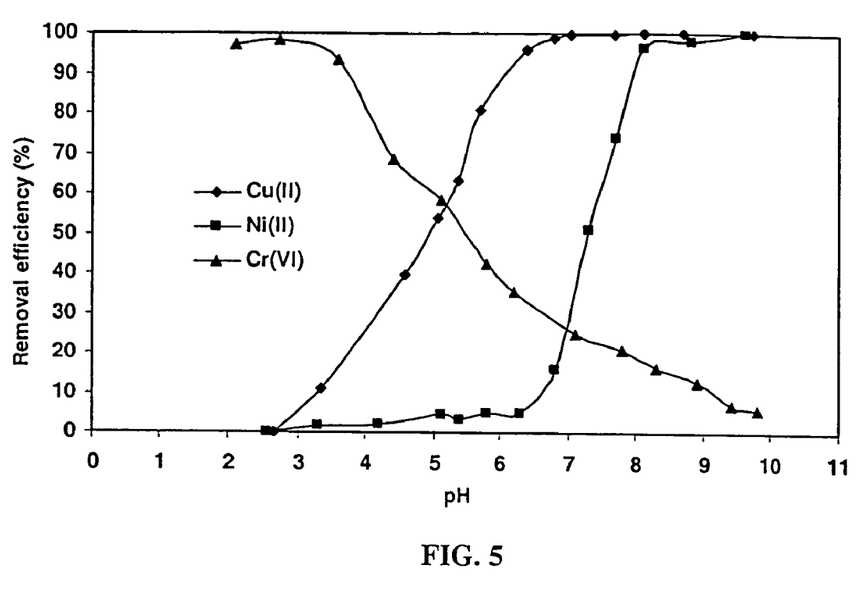
FIG. 5 is a graph of removal efficiency of heavy metals (Cu(II), Ni(II), and Cr(VI)) by maghemite nanoparticles as a function of solution pH.

One important advantage of the invention is the selective removal of heavy metals from wastewater. FIG. 5 gives the effect of solution pH on the percentage removal of heavy metals. As for Cr(VI), Cu(II) and Ni(II) metals are concerned, the removal efficiencies were strongly pH-dependent. The percentage uptake of Cr(VI) decreased gradually with increasing pH, while the percentage removal of Cu and Ni increased with solution pH. As observed, the maximum removal of Cr occurred at pH 2.5 (although the range could be about 2 to 3), while Cu and Ni were not at all removed at this pH. At pH 6.5 (pH in the range of about 6 to 7), the removal efficiency of Cu reached 96.2% with an insignificant amount of Ni removed. At pH 8.5 (range of about 8 to 9), almost 100% of Ni was removed. As a result, the selective removal of these three metals can be achieved by controlling solution pH.

Figure 6A:
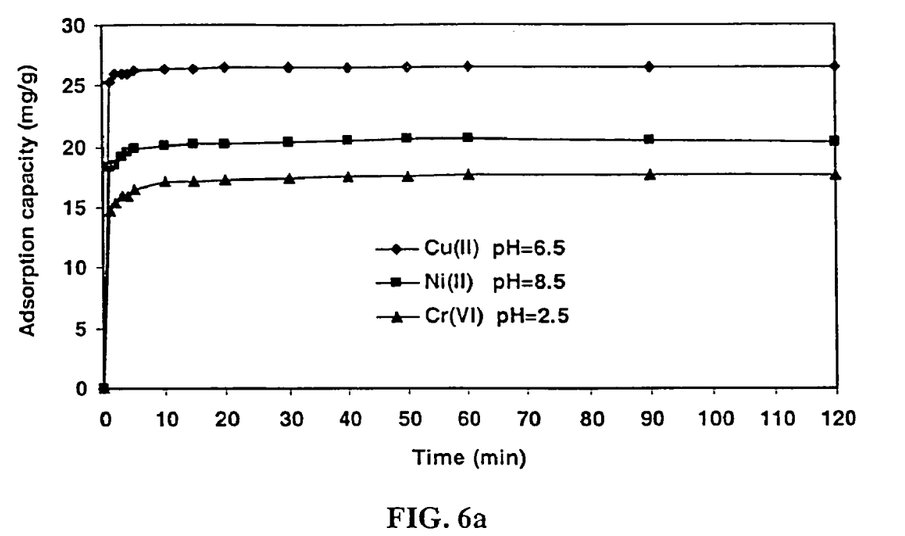
FIG. 6 is a plot of kinetic studies on the adsorption of heavy metal ions in solution by the inventive nanoparticles at specified pH and initial concentration.

Another conspicuous advantage of the invention is the very short adsorption time for heavy metal ions present in wastewater. FIG. 6a shows the effect of contact time on the adsorption of Cr(VI), Cu(II) and Ni(II) at pH of 2.5, 6.5 and 8.5, respectively. For these three metals, adsorption achieved equilibrium within 10 minutes with around 90% of metal adsorption occurring in the first minute.

Figure 6B:
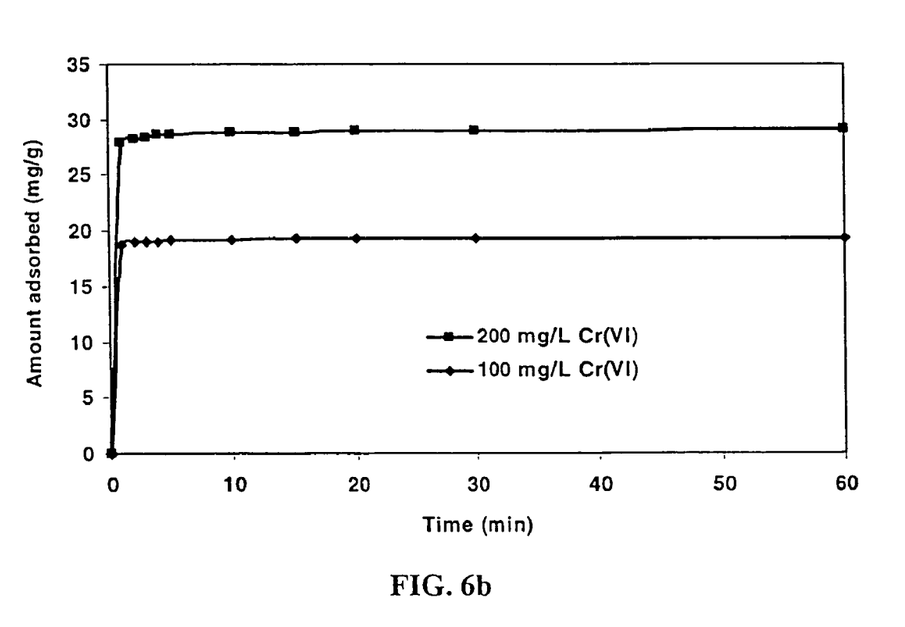

An adsorption kinetic study of heavy metal using modified jacobsite nanoparticles was conducted. FIG. 6b gives the effects of time and initial concentration on the adsorption of Cr(VI) by modified jacobsite nanoparticles. The adsorption of Cr(VI) reached equilibrium within 5 minutes and was independent of initial concentration. In comparison with maghemite nanoparticles, jacobsite nanoparticles showed advantages both in adsorption time and removal capacity for Cr(VI).

Figure 7:
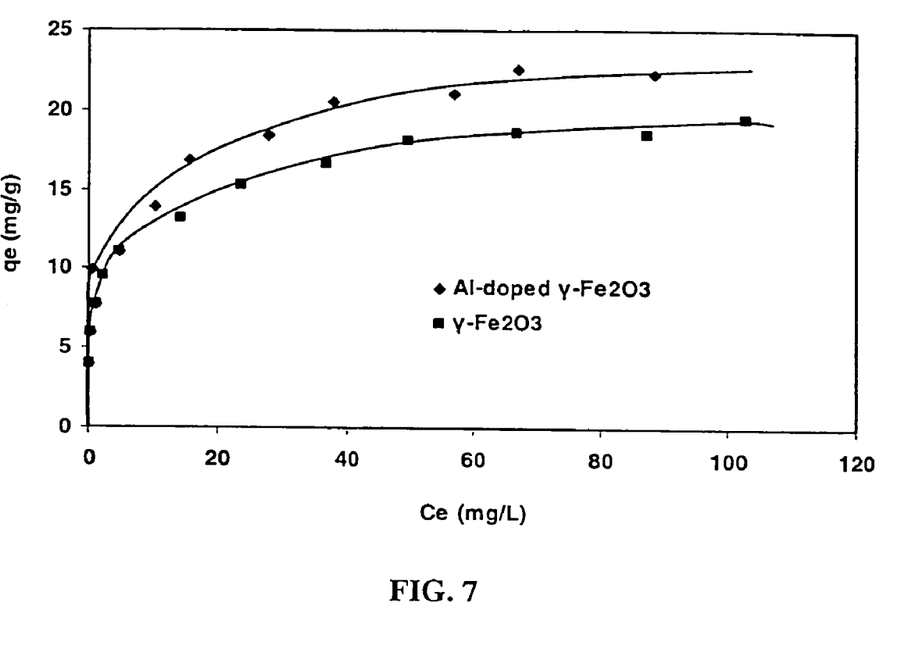
FIG. 7 is a plot of the enhancement of adsorption of undoped and Al-doped maghemite nanoparticles of the present invention.

The enhancement of the Cr(VI) adsorption by Al-doped maghemite nanoparticles was observed from Langmuir isotherms of the Cr(VI) uptake behavior of the undoped and the Al-doped maghemite nanoparticles containing 9.3% Al (FIG. 7). The adsorption capacity of Cr(VI) by Al-doped maghemite, determined to be 22.68 mg/g, is higher than that of pure maghemite, 19.42 mg/g, which indicated that the adsorption capacity of maghemite nanoparticles could be promoted by doping certain amount of aluminum.

Figure 8:
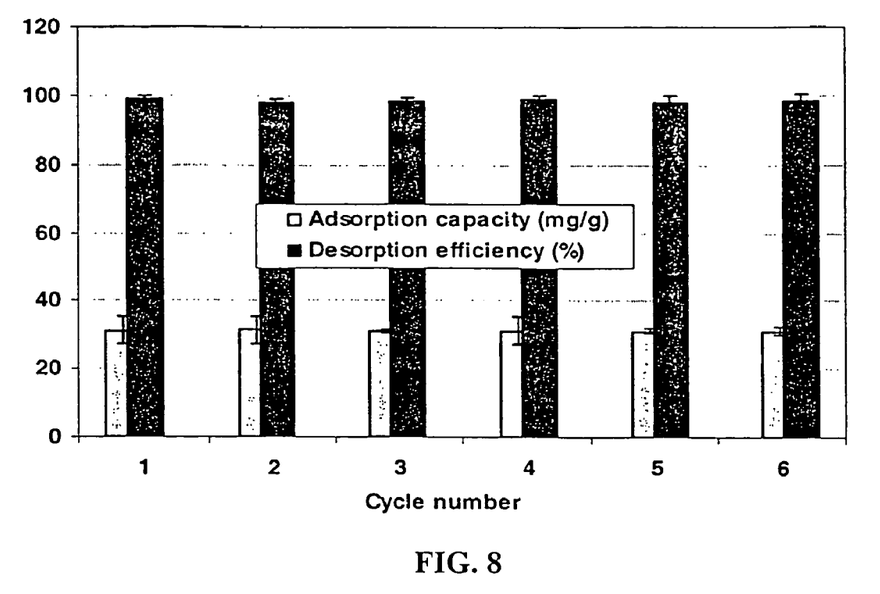
FIG. 8 is a graphical illustration of results of jacobsite regeneration and Cr(VI) readsorption in six consecutive cycles.

FIG. 8 presents the results pertaining to jacobsite regeneration and Cr(VI) re-adsorption in six consecutive cycles. As can be seen, at the first cycle, the adsorption capacity is 31.4 mg Cr/g nanoparticles. At the sixth cycle, the adsorption capacity is 31.3 mg/g. By comparison, the adsorption capacity remained almost unchanged after undergoing at least six cycles, indicating that there were no irreversible sites on the surface of the adsorbent and suggesting a high recovery capacity of adsorbent. In addition to chromium, iron and manganese were measured after each adsorption/desorption process and it was found that the concentrations of these two metals are nearly zero, hinting that the dissolution of the nanoparticles under stated experimental conditions is not a concern. Therefore, the stability and durability of the magnetic nanoparticles during adsorption and desorption processes were verified.

EXAMPLES

The following examples are illustrative of the practice of the present invention, and should not be viewed as limiting the scope thereof.

Example 1

A test was performed to determine the ability of undoped and Al-doped maghemite nanoparticles to remove Cr(VI) from solution. Synthetic wastewater containing 20 ml of 50 mg/L Cr(VI) was mixed with various doses of nanoparticles at a solution pH of 2.5 under a shaking speed of 100 rpm. At equilibrium, the adsorbent was separated completely within 10 seconds with a magnet and the supernatant was collected to measure metal concentration. The results from ICP are shown in Table 1.

The data show that the concentration of Cr(VI) in solution could be reduced to meet the discharge limit regulated by the U.S. EPA. It seems likely that a further treatment will not be needed.

TABLE 1

| Initial Cr(VI) (ppm) | Maghemite (g/L) | Remaining Cr(VI) (ppm) | Removal efficiency (%) |
| --- | --- | --- | --- |
| 50 | 2 | 13.2 | 74.0 |
| 50 | 3 | 0.08 | >99 |

| Initial Cr(VI) (ppm) | Al-doped maghemite (g/L) | Remaining Cr(VI) (ppm) | Removal efficiency (%) |
| --- | --- | --- | --- |
| 50 | 2 | 6.4 | 87.2 |
| 50 | 3 | 0.02 | >99 |

Example 2

A test was performed to determine the ability of maghemite nanoparticles to remove Cr(VI), Cu(II) and Ni(II) ions. 5 g/L particles were mixed with 20 ml of 80 mg/L Cr(VI), Cu(II) and Ni(II) at their optimal pH for 10 minutes. The results are shown in Table 2.

TABLE 2

| Metal | Initial concentration (ppm) | Remaining concentration (ppb) | Removal efficiency (%) |
| --- | --- | --- | --- |
| Cr(VI) | 80 | 90 | >99 |
| Cu(II) | 80 | 30 | >99 |
| Ni(II) | 80 | 30 | >99 |

Example 3

A test was performed to determine the ability of modified jacobsite nanoparticles to remove Cr(VI) from wastewater. Various doses of these particles were mixed with 20 ml of 100 mg/L Cr(VI) at pH 2.5 under shaking rate of 100 rpm for 5 minutes. The results for chromium concentration are shown in Table 3.

TABLE 3

| Initial Cr(VI) (ppm) | Modified jacobsite dose (g/L) | Remaining Cr(VI) (ppm) | Removal efficiency (%) |
| --- | --- | --- | --- |
| 100 | 3 | 5.4 | 94.6 |
| 100 | 4 | 0.02 | >99 |
| 100 | 5 | 0.01 | >99 |

Example 4

A test was performed to determine the effect of time and initial concentration on chromium adsorption. 5 g/L jacobsite nanoparticles were mixed with Cr(VI) at pH 2.5 for 5 minutes. Adsorption kinetic results are shown in Table 4.

TABLE 4

| Initial Cr(VI) (ppm) | Cr(VI) remaining After 1 minute | % removal | Cr(VI) remaining After 5 minutes | % removal |
| --- | --- | --- | --- | --- |
| 50 | 4.0 ppm | 92.0 | 50 ppb | >99 |
| 80 | 7.1 ppm | 91.1 | 30 ppb | >99 |
| 100 | 8.4 ppm | 91.6 | 10 ppb | >99 |

Example 5

Table 5 summarizes the adsorption capacity and equilibrium time of modified jacobsite and other adsorbents on the removal of Cr(VI) under similar conditions reported in the literature. The surface-modified jacobsite nanoparticles give a much shorter adsorption equilibrium time. Most adsorbents listed in this table are highly porous materials, providing adequate surface area for adsorption. However, the existence of intraparticle diffusion possibly leads to a decrease in the adsorption rate and available capacity, especially for macromolecules. Also, it has a relatively higher adsorption capacity than all the stated adsorbents, except for waste tires. However, the equilibrium time for Cr(VI) adsorption onto nanoparticle adsorbent is only 5 minutes, but it is as long as 8 hours for Cr(VI) adsorption onto waste tires.

TABLE 5

| Type of adsorbent | $q_m$ (mg/g) | Equilibrium time (hr) | Optimum pH |
| --- | --- | --- | --- |
| Coconut tree sawdust | 3.46 | 3 | 3.0 |
| Lignin | 5.64 | 24 | 2.5 |
| Distillery sludge | 5.70 | 1.75 | 3.0 |
| Blast-furnace slag | 7.50 | 6 | 1.0 |
| Diatomite | 11.55 | 2 | 3.0 |
| Aluminum oxide | 11.70 | 8 | 4.0 |
| Anatase | 14.56 | 24 | 2.5 |
| Activated carbon | 15.47 | 3 | 4.0 |
| Beech sawdust | 16.13 | 1.33 | 1.0 |
| Hazelnut shell | 17.70 | 5 | 2.0 |
| Spent grain | 18.94 | 8 | 2.0 |
| Carbon slurry | 24.05 | 1 | 2.5 |
| Larch bark | 31.25 | 48 | 3.0 |
| Modified jacobsite | 31.55 | 0.08 | 2.0 |
| Waste tire | 58.48 | 8 | 2.0 |

The present invention may be embodied in other specific forms without departing from its spirit or essential characteristics. The described embodiments are in all respects illustrative and not restrictive. The scope of the invention is, therefore, defined by the following claims, and variations all which come within the meaning and range of equivalency of the claims are to be embraced within their scope.

What is claimed is:

1. A method for synthesizing undoped and metal-doped maghemite nanoparticles, comprising the steps of:
    dissolving $FeCl_2 4H_2O$ and $FeCl_3 6H_2O$ salts in purified deoxygenated water to obtain a solution;
    adding base to the solution to precipitate the maghemite nanoparticles;
    isolating the maghemite nanoparticles by a physical separation technique; and
    removing impurities from the maghemite nanoparticles.

2. A method in accordance with claim 1, wherein the ratio of dissolved $FeCl_2 4H_2O$ to $FeCl_3 6H_2O$ salts ranges between 1:1 and 1:3.

3. A method in accordance with claim 2, wherein the ratio of dissolved $FeCl_2 4H_2O$ to $FeCl_3 6H_2O$ is about 1:2.

4. A method in accordance with claim 1, wherein adding base involves adding 1.5M $NH_4OH$ solution in small amounts.

5. A method in accordance with claim 1, wherein adding base involves adding aqueous ammonium hydroxide until the solution reaches or exceeds a pH of about 8.

6. A method in accordance with claim 1, wherein the physical separation technique involves filtration or magnetic separation.

7. A method in accordance with claim 1, wherein the physical separation technique involves magnetic separation using an externally applied magnetic field.

8. A method in accordance with claim 1, wherein the dissolving step additionally comprises adding an amount of AlCl3 sufficient to dope the maghemite particles.

9. A method in accordance with claim 1, wherein the nanoparticles are dispersed in octyl ether.

10. A method in accordance with claim 4, additionally comprising the step of adding Cr adsorbed nanoparticles into a sodium hydroxide containing eluent to release Cr from the nanoparticles.

11. A method according to claim 10 wherein the nanoparticles are recovered for use.

\* \* \* \* \*

UNITED STATES PATENT AND TRADEMARK OFFICE
CERTIFICATE OF CORRECTION

| | | |
|---|---|---|
| PATENT NO. | : 7,622,423 B1 | |
| APPLICATION NO. | : 11/520149 | |
| DATED | : November 24, 2009 | |
| INVENTOR(S) | : Jing Hu et al. | |

It is certified that error appears in the above-identified patent and that said Letters Patent is hereby corrected as shown below:

In the specification at column 3, line 3: "absorbed" should read --adsorbed--.

In the specification at column 3, line 27: "inventive" should read --modified jacobsite--.

In the claims, column 10, line 52: "AlCl3" should read --$AlCl_3$--.

Signed and Sealed this
Seventh Day of June, 2011

David J. Kappos
*Director of the United States Patent and Trademark Office*